United States Patent
Tomalia et al.

[15] 3,697,524
[45] Oct. 10, 1972

[54] PROCESS FOR PREPARING 1,4-DISUBSTITUTED PIPERAZINES

[72] Inventors: Donald A. Tomalia; Narayanlal D. Ojha, both of Midland, Mich.

[73] Assignee: The Dow Chemical Company, Midland, Mich.

[22] Filed: Oct. 31, 1969

[21] Appl. No.: 873,121

[52] U.S. Cl........260/268 SY, 260/239 E, 260/268 R, 260/306.7, 260/307 F
[51] Int. Cl..............................................C07d 51/72
[58] Field of Search................260/268 R, 268 SY, 260/239 E, 268 S

[56] References Cited

UNITED STATES PATENTS

| | | | |
|---|---|---|---|
| 3,247,220 | 4/1966 | Ham | 260/239 E |
| 3,404,172 | 10/1968 | Tomalia | 260/239 E |
| 3,449,396 | 6/1969 | Tomalia | 260/239 E |
| 3,247,185 | 4/1966 | Rabourn | 260/239 E |
| 3,359,270 | 12/1967 | Dick | 260/268 SY |
| 3,373,162 | 3/1968 | Dick | 260/268 SY |

OTHER PUBLICATIONS

Dermer et al. "Ethyleneimine and Other Aziridines," Academic Press (1969) pp. 108–109, 210–214, 214–215

*Primary Examiner*—Donald G. Daus
*Attorney*—Griswold & Burdick and C. E. Rehberg

[57] ABSTRACT

1,4-Disubstituted piperazines are prepared by contacting a basic catalytic aziridine with sulfur dioxide in the presence of a catalystic amount of iodide ion. In example, N-ethylaziridine dimerized when contacted with sulfur dioxide and a catalytic amount of sodium iodide to form 1,4-diethylpiperazine.

8 Claims, No Drawings

PROCESS FOR PREPARING 1,4-DISUBSTITUTED PIPERAZINES

BACKGROUND OF THE INVENTION

The broad class of aziridines (ethylenimines) is generally divided into two sub-classes based on their reactivity toward nucleophilic materials, i.e., amines and NaI. See G. E. Ham, J. Org. Chem., 29, 3052 (1964). The sub-classes of aziridines are referred to as "activated aziridines" or "basic aziridines," the latter being nonactivated.

The activated aziridines in the presence of an iodide ion are known to either isomerize to form oxazolines or thiazolines, or to dimerize to form 1,4-disubstituted piperazines. See H. W. Heine, Angew. Chem. International, Eng. Ed., 1, 528 (1962); and H. W. Heine et al., J. Am. Chem. Soc., 83, 2570 (1961).

Basic aziridines under similar conditions are inert or un-reactive. Basic aziridines then are N-substituted aziridines which contain a basic aziridinyl nitrogen capable of being protonated by a Bronsted acid or complexed with a Lewis acid, and are aziridines which normally are not affected by the presence of an amine or an iodide ion.

Basic aziridines, however, have been dimerized by I. Okada et al., Bull. Chem. Soc. (Japan), 42, 547 (1969), to form 1,4-disubstituted piperazines in 15–70 percent yields. The Okada reaction occurred in the presence of such catalysts as $AlCl_3$, $MgCl_2$, $SnCl_4$ and $ZnCl_2$.

The 1,4-disubstituted piperazines are a known class of compounds having many known uses, such as curing agents for epoxides, acid scavengers, etc.

SUMMARY OF THE INVENTION

It has now been discovered that 1,4-disubstituted piperazines are prepared by contacting a basic N-substituted aziridine with sulfur dioxide in the presence of a catalytic amount of iodide ion. The piperazine products are obtained in excellent yield and purity under mild process conditions.

The 1,4-disubstituted piperazines are represented by the structural formula (I)

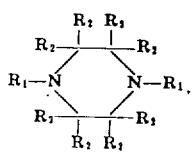

wherein $R_1$ is a hydrocarbon group having one to about 20 carbon atoms, such as an alkyl, aryl, aralkyl, alkaryl, alkenyl or cycloalkyl group, and $R_2$ is hydrogen or of the class of $R_1$.

Suitable basic N-substituted aziridine reactants are represented by the structural formula (II)

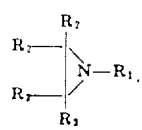

wherein $R_1$ and $R_2$ have the above meanings. Preferred aziridine reactants are those wherein at least two $R_2$ groups are hydrogen and $R_1$ is alkyl or aralkyl of one to about 10 carbon atoms; the most preferred reactants are those wherein at least three $R_2$ groups are hydrogen and the remaining $R_2$ group is hydrogen or alkyl of one to six carbon atoms and $R_1$ is alkyl of one to four carbon atoms or phenethyl.

Examples of suitable such aziridines include N-ethyl, N-propyl, N-butyl, N-hexyl, N-octyl, N-dodecyl, N-phenyl, N-phenethyl, N-(3,5-dimethylphenethyl), N-p-tolyl, N-(p-n-butyl)phenyl, N-allyl, N-butenyl, N-dodecenyl, N-cyclohexyl aziridine, and the corresponding 2-methyl, 2-ethyl, 2-hexyl, 2-decyl, 2,2-dimethyl, 2,2-di-n-butyl, 2,3-dioctyl, 2-methyl-3-hexyl, 2,2-dimethyl-3-butyl, 2-phenyl, 2,3-diphenyl, 2-benzyl, 2-p-tolyl, 2-allyl, 2-butenyl, 2-cyclohexyl-3-methyl aziridines, and other like compounds.

The iodide ion is necessary in the reaction in catalytic amounts, such as trace amounts up to about 10 percent by weight, based on the weight of aziridine reactant, or more. Substantially any source of iodide ion may be used, but generally the alkali metal iodides, such as NaI or KI, or the tetraalkyl ammonium iodides, such as tetra-n-butyl ammonium iodide, are preferred based on current commercial availability and solubility in the solvent system.

In some instances, the catalyst may be only partially soluble in the reaction mixture at the reaction temperature. In those instances, an inert, aprotic solvent (generally polar) may be used advantageously to solubilize the catalyst. Typical solvents include acetonitrile, propionitrile, butyronitrile, dimethylformamide (DMF), benzene and $SO_2$.

$SO_2$ may be included in substantially any amount in the process, but best product yields are obtained when at least equimolar amounts of $SO_2$, based on aziridine, are used. Preferably, $SO_2$ is used in excess to (a) force the reaction to completion and (b) serve as a reaction solvent.

The temperature is suitably selected between about −20°C. and about 150°C., and is preferably selected between about 40°C. and about 80°C. The reaction occurs at temperatures above and below the indicated limits, but at temperatures below about −20°C., the reaction rate is too low to be practical; and, at temperatures above about 150°C., necessary $SO_2$ tends to be lost as a gas unless a closed pressurized reactor is used.

The temperature and pressure may be varied so long as the reaction mixture remains substantially in the liquid phase. Atmospheric and superatmospheric pressures are therefore suitable.

The time may vary from a few minutes to a few hours, depending upon the reactivity of the aziridine and the temperature. Typically, the process is substantially complete in about 0.1 to about 2 hours.

Substantially anhydrous conditions are preferred since water reacts with $SO_2$ to form acidic products which causes the aziridine to homopolymerize.

The process may be conducted as a batch process or as a continuous process. In the latter instance, the reaction mixture may be passed through a heated tube, the product collected and the remaining materials recycled.

The piperazine product is usually obtained from the reaction mixture as a piperazine·$SO_2$ or piperazine·HI complex. The free piperazine may be obtained by warming the complex under reduced pressure, or by displacing $SO_2$ with HCl, HBr or HI and thereafter neutralizing the acid, by decomposing the complex with caustic, or by any other convenient method.

SPECIFIC EMBODIMENTS

The following examples further illustrate the invention.

EXAMPLE 1

Preparation of 1,4-bis(Phenethyl)Piperazine

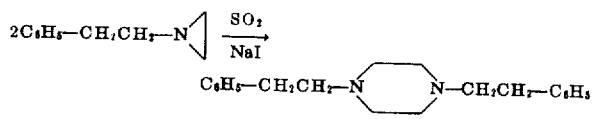

A solution of N-phenethylaziridine (7.35 g., 0.05 mol) in 25 ml. of acetonitrile was added to 25 ml. of liquid $SO_2$ at −10°C. Sodium iodide (0.5 g.) was added to this intense yellow solution and the mixture stirred for 30 min. The mixture was then gradually warmed to 50°C. and maintained at that temperature for 1 hour. Removal of the solvent afforded 10.6 g. of crude material. This piperazine·$SO_2$ complex was converted to the hydrochloride salt by stirring the viscous liquid into ethyl ether saturated with anhydrous hydrogen chloride; 8.4 g. of the salt was thus obtained. A portion of the hydrochloride salt (3.3 g., 0.01 mole) was converted to the free piperazine by dissolving same in 45 ml. of aqueous methanol and adding 10 ml. of 10% NaOH solution. The product was recovered from the mixture by ether extraction and further purified by distillation under reduced pressure followed by recrystallization in ether; m.p. 78°–80°C.

EXAMPLE 2

Preparation of 1,4-bis(Ethyl)Piperazine

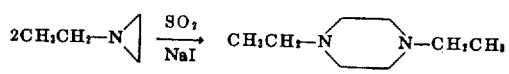

A solution of N-ethylaziridine (7.1 g., 0.1 mole) in 25 ml. of acetonitrile was added to 50 ml. of liquid $SO_2$. Sodium iodide (0.75 g.) was added to the mixture and the mixture stirred at −10°C. for 30 min. and then stirred overnight at room temperature. The acetonitrile was removed under reduced pressure and 3.0 g. of the $SO_2$ complex was decomposed in 20 ml. of methanol with 3 g. of KOH. The product was recovered from the mixture by ether extraction (0.8 g. obtained-orange liquid) and purified by distillation under reduced pressure; b.p. 68°C. at 20 mm.

EXAMPLE 3

Preparation of 1,4-bis(n-Butyl)Piperazine

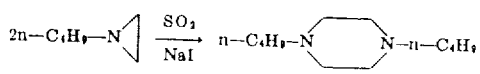

n-Butylaziridine (4.95 g., 0.05 mole) was reacted in an experiment identical to Example 1 except for the aziridine reactant. The acetonitrile was removed under reduced pressure leaving 11.4 g. of the piperazine·$SO_2$ complex. The product was obtained by distilling the $SO_2$ complex over solid KOH; b.p. 153°–155°C. at 20 mm.

EXAMPLE 4

Preparation of 1,4-bis(Phenethyl)-2,5-Dimethyl piperazine

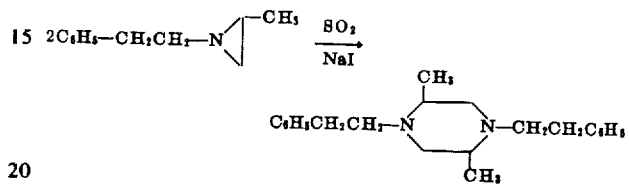

2-Methyl-1-phenethylaziridine (3.2 g., 0.01 mole) was reacted in an experiment identical to Example 1 except for the aziridine reactant; 4.6 g. of piperazine·$SO_2$ complex was obtained. The $SO_2$ complex (3.0 g.) was decomposed in methanol with KOH and the product was recovered from the mixture by ether extraction (1.6 g.); the product was characterized by its picrate derivative (m.p. 236°C.).

Similar results are obtained by using other aziridine reactants as defined above in similar reactions.

Each of the piperazine products are useful in curing epoxy resins.

We claim:

1. A process for preparing 1,4-disubstituted piperazines having the structural formula

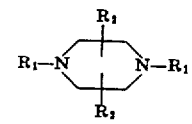

wherein $R_1$ is a primary or secondary alkyl of from one to 10 carbon atoms, phenyl, phenyl alkyl or alkyl phenyl of from seven to 10 carbon atoms, and wherein $R_2$ is hydrogen or of the class of $R_1$, said process comprising reacting by contacting in the liquid phase and in the presence of iodide ion a. a basic aziridine having the structural formula

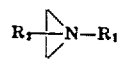

wherein $R_1$ and $R_2$ have the above meaning, with b. sulfur dioxide.

2. The process defined in claim 1 wherein the reaction is conducted at a temperature between −20° and 150°C.

3. The process defined in claim 1 wherein the reaction is conducted in an inert, aprotic solvent.

4. The process defined in claim 3 wherein said solvent is acetonitrile, propionitrile, butyronitrile, dimethylformamide, $SO_2$ or benzene.

5. The process defined in claim 1 wherein $R_1$ is alkyl of one to 10 carbon atoms or phenylalkyl of seven to 10 carbon atoms.

6. The process defined in claim 1 wherein $R_2$ is hydrogen or alkyl of from one to six carbon atoms.

7. The process defined in claim 6 wherein $R_1$ is hydrogen.

8. The process defined in claim 5 wherein $R_1$ is alkyl of from one to six carbon atoms or phenethyl.

* * * * *